Feb. 12, 1929.　　　　　　　　　　　　　　　1,701,713
C. H. ALLEN ET AL
SAUSAGE TWISTING MACHINE
Filed April 7, 1927　　　　5 Sheets-Sheet 1

INVENTORS:
Charles H. Allen &
Jolly L. Morris
by Royal Doucette
Paul Purchard.
Attorneys Feb. 12, 1929. 1,701,713
C. H. ALLEN ET AL
SAUSAGE TWISTING MACHINE
Filed April 7, 1927 5 Sheets-Sheet 3

Patented Feb. 12, 1929.

1,701,713

UNITED STATES PATENT OFFICE.

CHARLES H. ALLEN, OF PITTSBURGH, AND JOLLY L. MORRIS, OF CRAFTON, PENNSYLVANIA, ASSIGNORS TO PACKERS SPECIALTY COMPANY, OF PITTSBURGH, PENNSYLVANIA, A CORPORATION OF PENNSYLVANIA.

SAUSAGE-TWISTING MACHINE.

Application filed April 7, 1927. Serial No. 181,783.

This invention relates to sausage twisting or linking machines.

The primary object of this invention is to provide a machine for automatically dividing a filled sausage-casing into sausages of a specified length and tying said individual sausages by means of the twisting process used nowadays on most types of smaller sausages; such as the so-called wieners, Frankfurters, pork-sausage and so forth. Another object of this invention is the provision of a machine which is adapted to operate on the finest kinds of sausage-casings without injuring them and which is adapted to do the work of several persons with greater uniformity and perfection. A further object is to provide an automatic sausage linking machine which is relatively simple in construction, very sanitary in so far that it reduces handling of such goods by human hand to a very great extent, and which affords a very great saving of floor space as compared with the present method of twisting sausages by several persons working side by side on a table of considerable length.

This application is especially intended to cover important improvements made over another machine of similar purpose, which forms the subject matter of a copending application filed in the United States Patent Office on March 28th, 1927, and bearing the Serial Number 178,989. These improvements consist principally in dividing the work required in forming and twisting sausage-links on two conveyors, instead of one, and in providing special features for the automatic and periodic cleaning of the twisting elements of said machine.

These, and other improvements, as well as their advantages will be dealt with in the following description considered in connection with the several drawings forming a part of this application, and in which.

By referring to the drawings, it will be noted that our improved machine comprises a vertical supporting structure made of two frames 1 and 2 held in proper parallel relation by various cross-members to be described later and by means of bolts 3 inserted through the feet 4 of the frame legs 5. Rotatably mounted in the front bearings 6 and the rear bearings 7 are the horizontal shafts 8 and 9 upon which are keyed or otherwise secured two sets of equally spaced and identical sprockets 10 and 11, properly aligned to be engaged by the endless chains 12 and 13 arranged in the manner shown in Figs. 1 and 2 especially and, which combined, form what we term the main-conveyor.

At the forward end of the frames are provided the frame extensions 14 upon which are mounted the bearings 15 wherein is rotatable a shaft 16 which carries a pair of spaced and keyed sprockets 17. Sprockets 18, of suitable diameter are secured in alignment with said front sprockets 17 on a shaft 19 running in stationary bearings 20 positioned in the rear legs 21 of the main frames. Trained about these two sets of sprockets are the chains 22 which form part of the feed-conveyor of the machine. Idler sprockets 23 are also mounted on a shaft 24 journaled in the bearings 25 provided in the intermediate legs 26 of the frames.

Proper tension in the chains of the main conveyor and the feed conveyor is obtained by means of the adjusting screws 26 and 27 which act upon the slidably mounted bearings 7 and 15, respectively.

Figure 1:
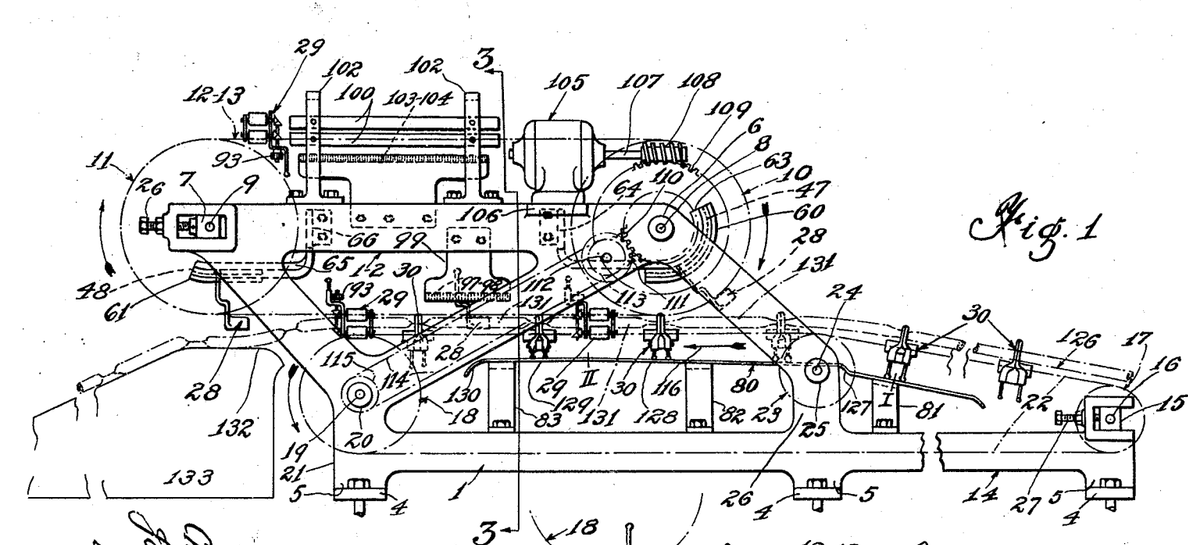
Fig. 1 is a side elevation of our improved machine, the usual guides for the conveyor-chains having been omitted, for the sake of greater clarity.
Figures 3, 4, 5:
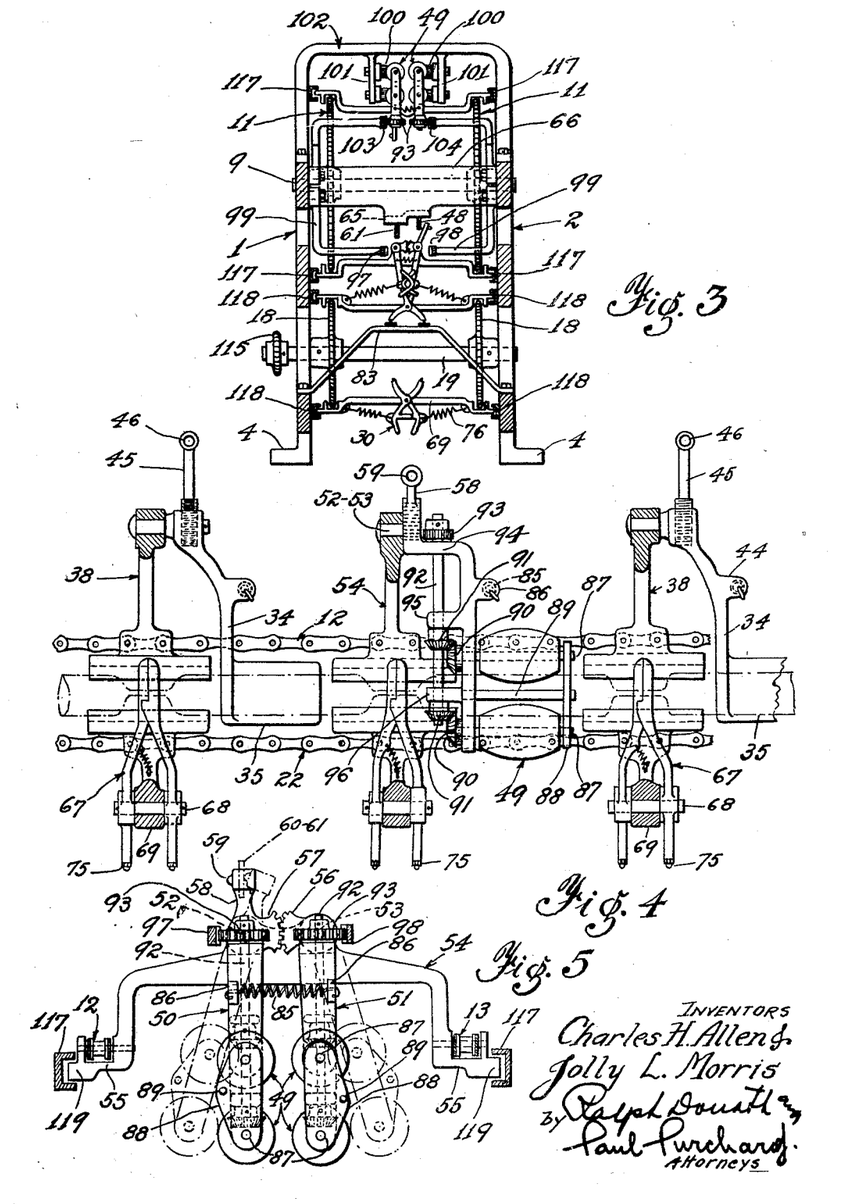
Fig. 3 is a cross sectional elevation of the machine, taken on line 3—3 in Fig. 1.
Fig. 4 is a side elevation of a complete set of sausage pinching, clamping and twisting elements, certain parts being shown partly in section.
Fig. 5 is an end elevation of a complete sausage twisting element.

Evenly and alternately spaced all around the main-conveyor are the sausage-clamping elements 28 and the sausage twisting elements 29. Upon the feed conveyor are also evenly spaced the pinching elements 30 in such a manner that they will fit in halfway between the clamping and twisting elements, when in operative position, as shown in Figs. 1 and 4, especially. The speed of both conveyors is, of course, the same in order to insure proper cooperation between the elements.

Figure 6:
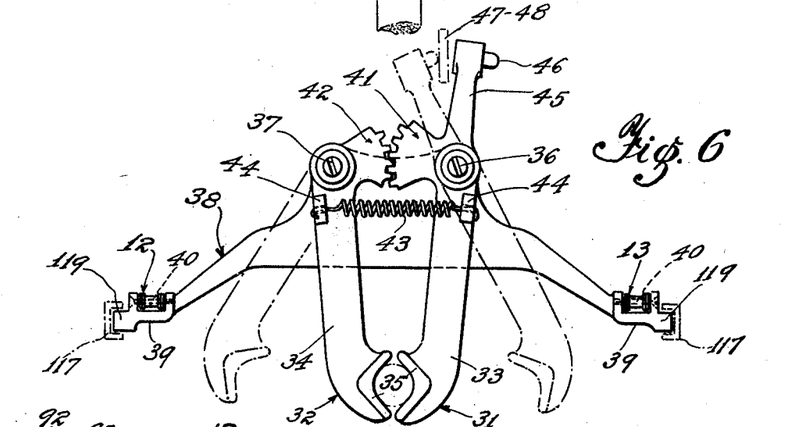
Figs. 6 and 7 are respectively a side elevation and a top plan view of a sausage clamping element.
Figure 7:
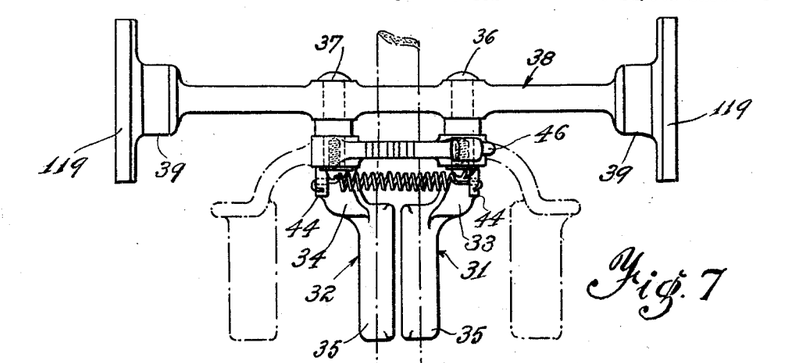

The construction of the clamping elements is especially detailed in Figs. 6 and 7. As shown therein, each clamp comprises the clamping halves 31 and 32 consisting of the lever-arms 33 and 34 and the sausage engaging V-shaped shells 35. The clamping halves are pivotally mounted on the fulcrum-pins 36 and 37 which are secured in the clamp-yoke 38, the ends 39 of which are attached to the main conveyor chains 12 and 13 by means of the special chain-link-pins 40. Meshing gear-sectors 41 and 42 are provided on the clamping halves for the purpose of insuring uniform and simultaneous arcuate movements of the latter. The sausage clamp is normally held in the closed position, shown in solid lines, by means of the coil spring 43 which is hooked to the lugs 44. The clamp-half 33 has an extension 45 in which an anti-friction contact element, such as the hardened contact-button 46, is secured. This button is adapted to come in contact with the inner faces of the clamp-guide-rails 47 and 48, disposed respectively at the front and rear ends of the machine.

Figure 2:
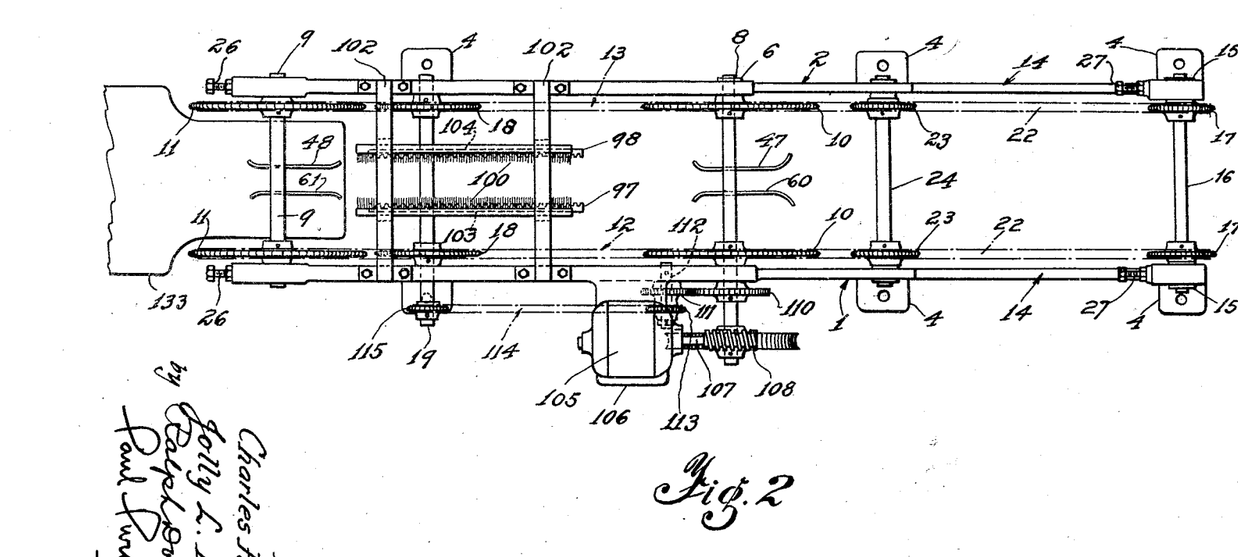
Fig. 2 is a top view of Fig. 1, but with the pinching, clamping and twisting elements, as well as other parts shown in separate figures, omitted.

The general arrangement of the sausage twisting elements is best illustrated in Figs. 4 and 5. Each twisting element consists of four identical and preferably corrugated rollers 49 disposed in groups of two arranged in vertical alignment on two levers 50 and 51 rockably mounted on the pivot-pins 52 and 53, secured in a yoke member 54, the ends 55 of which are fastened to the main conveyor chains in the same manner as for the yoke 38. These levers have also meshing gear-sectors 56 and 57. The lever 50 has an extension 58 in which is mounted the contact-button 59 which is adapted to slide along the inner faces of the roller-cam-rails 60 and 61 which, as shown in Fig. 2, are placed respectively in spaced and substantially parallel relation to the clamp-rails 47, 48. The rollers are held normally in closed position by a coil spring 85 having its ends attached to the lugs 86 provided on the levers.

In the construction shown in the drawings, the front rails 47, 60 are positioned on a common base 63 depending from a cross-piece 64 which serves also as a tie for the frames 1 and 2. This base and the clamp-rails are substantially level at their bottom portion, but are bent up at the front to the proper curve to facilitate the engagement of the clamp-rails by their respective contact-buttons, while traveling about the periphery of the sprockets 10. Similarly, the rear rails 48, 61 have also a common base 65 connected to a cross-piece 66 which acts as another tie for the frames. As shown in Fig. 2, the ends of these four rails are flared outwardly to effect their gradual engagement by their respective contact-buttons.

Figure 8:
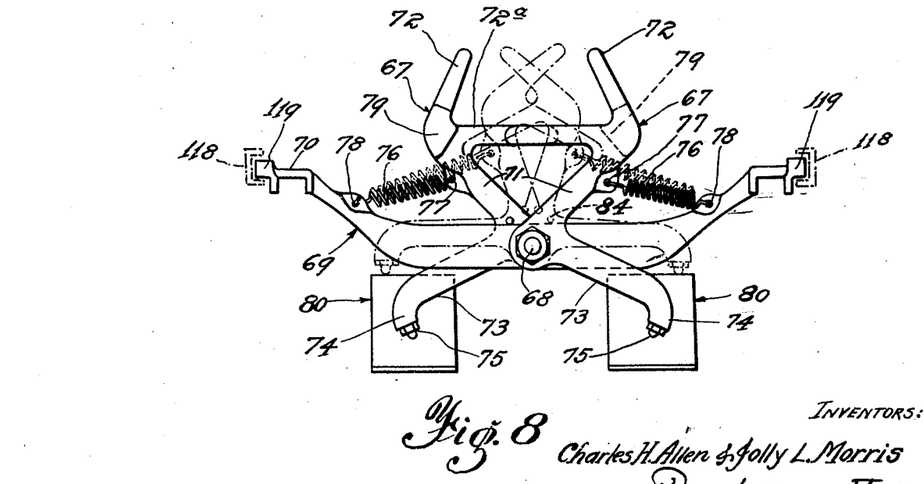
Figs. 8 and 9 show a side elevation and a top plan view of a sausage pinching element.
Figure 9:
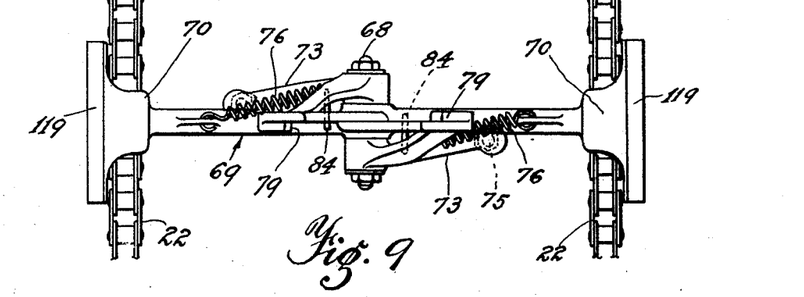
Figure 10:
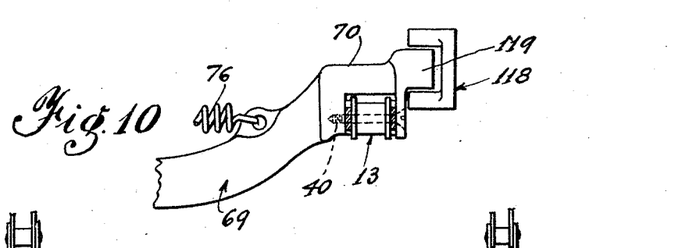
Fig. 10 is a fragmentary view showing on an enlarged scale one end of the yoke member shown in Fig. 8.

Referring in particular to Figs. 8 and 10, each pincher-element 30 consists of two adjacent pinch-fingers 67 having substantially the shape of a bell-crank-lever and which are mounted for opposite rocking movement upon a common fulcrum pin 68 secured upon a transverse yoke 69 having its ends 70 fastened to the feed conveyor chains 22. Each pinch-finger comprises an upper arm 71 at the end of which is integrally formed the V-shaped squeezer 72, the inner leg 72$^a$ of which is constantly in partial overlapping engagement with the corresponding leg of the other pinch-finger. At the end of the lower arm 73 of each pinch-finger is a bent extension 74 on which is secured any desired and suitable type of anti-friction contact-element, suggestively indicated in the figures by the hardened contact-buttons 75. These pinch-fingers are normally held into open, i. e. non-pinching, position by means of the coil-springs 76 the ends of which are hooked in apertures 77 and 78 provided respectively on said fingers and the yoke-member 69. At the apex of each squeezer 72 there is provided at one side a thickening boss 79, properly rounded off at all corners coming in contact with the stuffed casing, to prevent any injury thereto. The thickness of this boss determines to a great extent the length of the twisted connection between two sausage-links.

The gradual, partial or full, closing of the pinch-fingers is effected by means of two identical flat and suitably bent pincher-cam-rails 80 disposed below the upper portion of the feed-conveyor and the upper faces of which may be engaged by the contact-buttons 75. These cam-rails are secured to the frame structure by means of supports 81, 82, 83 bolted to both frames 1 and 2, thus serving also as ties for the latter. The outward swinging movement of each pinch-finger is limited by a pin 84, suitably located on said finger and adapted to strike against the yoke-member 69.

One of the principal advantages of mounting the pinching-elements 30 on the feed conveyor resides in the fact that the gradual pinching of a stuffed casing may be carried on for a longer time (to suit the kind of casing used), by simply lengthening said conveyor and its cam-rails, without having to increase accordingly the number of clamping and twisting-elements, as would be the case were said pinching-elements mounted on the same conveyor with the other elements; this feature greatly reduces the cost of the machine and permits of using the same main-conveyor in combination with feed-conveyors of various lengths. Another advantage is that said pinching-elements perform also the duty of carriers for the stuffed sausage-casings, before they begin to pinch them.

The twisting of a sausage-link is obtained by rotating the rollers 49 between which said link is held by the action of the spring 85. Each of the two rollers carried on the same lever is keyed upon a shaft 87 which is rotatably mounted in said lever and which has its outer end supported by an end-plate 88 rigidly connected to said lever by means of the spacer-bar 89. Each roller-shaft has at its inner end a bevel gear 90 which is in meshing engagement with a similar gear 91 secured on the vertical shaft 92, at the upper end of which is keyed a spur-gear 93. The last mentioned shaft is properly guided for rotation by bearings provided in the horizontal portion 94 at the top of the lever and in the lugs 95 and 96 which are cast on said lever. Suitably positioned along the path of travel of the main-conveyor are the rack-members 97 and 98 which, in the drawings, are shown as secured to the frames 1 and 2 by the L-shaped brackets 99. These racks are properly spaced to be engaged by the two spur-gears 93 of each twisting element, whereby the rollers thereof will be rotated, all in the same direction. For reasons to be explained later, we prefer to rotate the successive sets of twisting elements in opposite directions. This can be easily achieved by mounting the bevel-gears 91 on their corresponding shafts 92 so that they will engage the bevel-gears 90 alternately above or below, as suggested in dot and dash lines in Fig. 11.

Experience has shown that the twisting-rollers, after short usage, acquire a coating of grease and sausage-meat, whereby the proper twisting of the sausage-links is considerably impaired, due to slipping. To remedy this trouble, we have supplied our machine with means for automatically cleaning said rollers, while on the idle portion of the conveyor. To this end, we install at the top of the machine two sets of brushes 100 of suitable length which are properly spaced to engage the outside of the twisting-rollers 49. These brushes are mounted on hangers 101 depending from the bridge-supports 102 which are bolted to both frames. Racks 103 and 104 are also mounted on the main frames in proper position to be engaged by the spur-gears 93, so that the twisting-rollers will be rotated and thoroughly cleaned while passing between the brushes.

The power for operating the machine may be derived from any suitable source. We prefer to use a single electric motor 105 which is mounted upon a bracket 106 secured to one of the frames. The motor-shaft 107 has a worm 108 which drives a worm-gear 109 mounted on the forward shaft 8, whereby the main conveyor is operated. The motor power is also transmitted to the feed-conveyor by means of the spur-gear 110, also secured on the shaft 8, said spur-gear driving a pinion 111 rotatable upon a stud-shaft 112 securely held on the frame 1. Secured to said pinion, or formed as a unit therewith, is a sprocket-wheel 113 which transmits motion to the feed-conveyor through the agency of the transmission-chain 114 and the sprocket-wheel 115 keyed at one end of the shaft 19. By this arrangement the working sides of the main-conveyor and the feed-conveyor will move in the proper direction, as indicated by the arrow 116 in Fig. 1, and at the same speed, due care being taken to correctly proportion the various gears and sprockets to that effect.

To prevent wobbling and sagging of the conveyor-chains and the various elements carried thereby, it is desirable to support said chains in suitable guides, such as the channel-shaped guides 117 and 118 indicated in Fig. 3 for the main-conveyor and the feed-conveyor respectively. These channels are secured in any desired manner to the frames and are engaged by smoothly finished guide-lugs 119 provided on the various yokes and which are adapted to glide in said guides.

As will be understood, the spacing between the cooperating, adjacent, portions of both conveyors must be such as to insure the proper engagement of a stuffed casing by the several elements on said conveyors.

Figure 11:
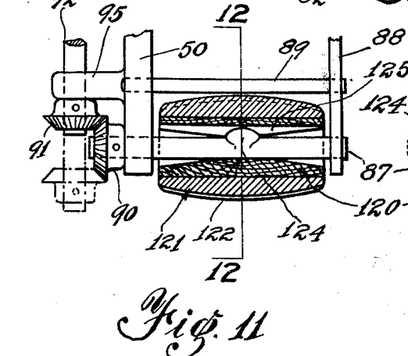
Fig. 11 is a longitudinal section through a sausage twisting roller.
Figure 12:
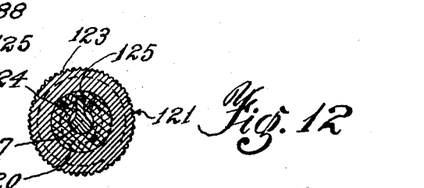
Fig. 12 is a cross-section taken on line 12—12 in Fig. 11.

Although satisfactory results have been had with straight cylindrical twisting-rollers, as shown in Fig. 1, better results are obtainable by using rollers built according to the somewhat more expensive construction shown in Figs. 11 and 12. In this improved construction each roller consists of an inner cylindrical core-member 120 upon which is secured an outer sleeve 121 which is preferably made of a semi-yielding and impervious material, such as rubber, compressed cork, etc. having curved sides 122 in which corrugations 123 are molded. The core member is bored conical from both ends so that it will rest only at the middle portion of the shaft 87. On the latter is pressed out a key 124 which engages a slot 125 cut in the core. From the foregoing, it will be seen that each roller is enabled to rock lengthwise on its shaft and adapt itself very easily to the contour of a sausage-link, thus reducing losses and troubles due to breaking of tender casings.

The operation of our machine will now be described by following the performance of a group of pinching, clamping and twisting elements, reference being had especially to Fig. 1. Assuming that the motor be running, the main-conveyor and the feed-conveyor will move in the direction indicated by the arrows. The operator lays a previously stuffed casing 126 upon the inner legs 72ª of the now open pinching-elements 30 at the very front of the machine. During the travel of the feed-conveyor the contact-buttons of said pinchers come successively in contact with the forward end of the pincher-cam-rails 80, whereby the pinchers will, at first, close slightly upon the casing, as suggested at I, in Fig. 1. Just before passing over the idler-sprockets 23, said contact-buttons glide over the pronounced upward bend 127 in the rails, whereby the casing is pinched to a much greater extent. From now on, the pinching is slowly and gradually increased by the small upward inclination of the portion 128 of the rails, until the contact-buttons reach the position II which denotes the end of the gradual rise of the rails. At this point the pinchers have fully closed up on the casing and remain in this condition while traveling over the level portion 129 of the rails, until they finally open up after leaving the rear downward bend 130 on the rails It will also be noted from Fig. 1 that as soon as each pinching element passes over the point of tangence of the conveyor chains on the sprockets 23, it will assume for a while a radial position and the apex of the squeezers 72 will describe a longer arc than the conveyor chains. This introduces in each sausage-link at the left of said sprockets a certain amount of slack which relieves the links of any tension during the subsequent final pinching and twisting of the links. It is for the purpose of producing this slack in the sausage-links that the forward portion of the feed-conveyor 22 is inclined, instead of being level. The greater the inclination, the greater will also be the arc described by the pinching elements and, therefore, also the slack in the sausage links.

Thus, the stuffed casing has been divided by the pinching-elements into sausage links 131, which have not yet been twisted. The twisting is done as follows: During the simultaneous operation of the main-conveyor, one of the spring-closed clamping elements 28 gets into engagement with the forward curved end of its cam-rail 47 and opens up so that its shells 35 face toward both sides of a sausage-link. Upon leaving its rail, the clamping element closes up on the sausage-link and clamps same firmly. Next follows a spring-closed twisting-element which is also opened up by engaging its forward cam-rail 60 and which after leaving the latter will compress the next following sausage-link between its twisting-rollers, due to the action of the spring 85. As will be understood, there will be a pinching-element halfway between the clamping and the twisting elements, so that the string of sausages will be well supported, and said string will be composed alternately of clamped and twisted links.

Just before the pinching-element immediately in advance of a twisting element passes over the bend 130, the spur-gears 93 engage the racks 97, 98 and the sausage-link held by the rollers of said twisting element is rotated or twisted approximately one and one-half or two turns before said pinching-element opens up again. The twisting of the link will continue for several turns more until the spur-gears leave the racks. The reason for opening the front pinchers before the twisting is completed is to enable a certain amount of displacement of the meat in the twisted link, which displacement might cause rupture of the casing, were the twisted link pinched tightly at both ends. Experience has also shown that the pinching of a stuffed casing may be performed rapidly at the beginning and that when the casing has been considerably reduced, any further pinching should be carried on very slowly. These conditions are taken care of in our machine by the sharp bend 127 and the slow rise of the portion 128 of the cam-rails 80.

Upon further motion of the main-conveyor, the clamping-elements and the twisting-elements will engage their respective cam-rails 48 and 61 at the rear of the machine and release the fully twisted sausage-links, which then drop on the adjacent flat portion 132 of the receiving chute 133, to be carried away by an attendant.

In order to prevent the untwisting of a string of sausage-links, the rollers of the consecutive twisting-elements are rotated in opposite directions, so that the pinched portions at each end of a sausage-link will be twisted in opposite directions too. Thus it will be seen that the unwinding of one twisted portion will be resisted by the further winding of the other end. The opposite rotation of the twisting-rollers is obtained by changing the relative positions of the bevel-gears 90 and 91, as explained hereinbefore.

After traveling about the rear sprockets 11, the twisting-rollers pass between the set of brushes 100 and are cleaned in the manner described above.

Figure 13:
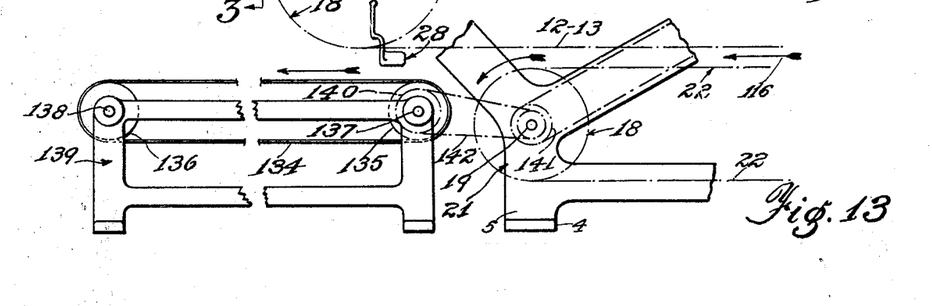
Fig. 13 is a diagrammatic and fragmentary view showing a discharge conveyor used in connection with our machine.

Instead of discharging the sausage-links on a stationary receiving chute, a conveyor may be used for discharging at a specified point. This conveyor consists of an endless belt 134 trained about pulleys 135, 136, keyed respectively on the shafts 137 and 138 rotatably mounted on a suitable frame 139. A sprocket 140 is secured at one end of the shaft 137 and is connected to another sprocket 141, mounted on the shaft 19, by a drive-chain 142. The speed of travel of this belt is slightly less than that of the feed-conveyor in order to produce a certain "crowding" of the sausage-links whereby the string of sausages is relieved of any tension which might damage the casing.

While the illustrated example constitutes a practical embodiment of our invention, we do not limit ourselves to the mechanical details herein illustrated, since manifestly the same can be considerably varied without departing from the spirit of the invention as defined in the appended claims.

We claim:

1. In a sausage-twisting machine, an endless feed-conveyor for feeding a stuffed sausage-casing and an endless main-conveyor; a plurality of pinching elements disposed equidistantly about said feed-conveyor and adapted for supporting said casing and dividing same into sausage-links; spring actuated means for normally holding said pinching elements into non-pinching position; stationary means for closing said pinching elements into casing pinching position; link clamping and link twisting means disposed equidistantly and alternately about said main-conveyor, and unitary means for operating said conveyors at the same speed.

2. In a sausage twisting machine, an endless feed-conveyor for feeding a stuffed sausage-casing; a plurality of pinching-elements disposed equidistantly about said feed-conveyor and adapted for supporting said casing and dividing same into sausage-links; each of said pinching-elements comprising a pair of pinch-fingers mounted for opposite rocking movement upon a common fulcrum and having each a V-shaped casing-squeezing portion, and a thickening boss positioned at one side of the apex of said squeezing-portion, for the purpose set forth.

3. In a sausage-twisting machine, a sausage twisting-element comprising four parallel rollers adapted to engage therebetween a sausage-link; spring actuated means for normally pressing the rollers against said sausage-link, and means for simultaneously rotating said rollers in the same direction for the purpose of twisting said sausage-link.

4. In a sausage twisting machine, a sausage twisting-element comprising four parallel rollers adapted to receive therebetween a sausage-link, said rollers being disposed in two groups of two rollers mounted in vertical alignment; a lever for supporting each group of rollers; a pivot-pin for each lever; means for connecting said levers for simultaneous arcuate movement, and means for rotating said rollers for the purpose of twisting said sausage-link.

5. In a sausage twisting machine, a sausage twisting element comprising four parallel rollers adapted to receive therebetween a sausage-link, said rollers being disposed in two groups of two rollers mounted in vertical alignment; a lever for supporting each group of rollers; a pivot-pin for each lever; means for connecting said levers for simultaneous arcuate movement; means for normally closing said two groups of rollers into sausage engaging position, and means for rotating said rollers for the purpose of twisting said sausage-link.

6. In a sausage twisting machine, a sausage twisting element comprising four parallel rollers adapted to receive therebetween a sausage-link, said rollers being disposed in two groups of two rollers mounted in vertical alignment; a lever for supporting each group of rollers; a pivot-pin for each lever; means for connecting said levers for simultaneous arcuate movement; spring actuated means for normally closing said two groups of rollers into sausage engaging position, and means for rotating said rollers for the purpose of twisting said sausage-link.

7. In a sausage twisting machine, a sausage twisting element comprising four parallel rollers adapted to receive therebetween a sausage-link, said rollers being disposed in two groups of two rollers mounted in vertical alignment; a lever for supporting each group of rollers; a pivot-pin for each lever; means for connecting said levers for simultaneous arcuate movement; means for normally closing said two groups of rollers into sausage engaging position; means for rotating said rollers for the purpose of twisting said sausage-link, and means for disengaging said rollers from the sausage-link.

8. In a sausage twisting machine, a sausage twisting element comprising four parallel rollers adapted to receive therebetween a sausage-link, said rollers being disposed in two groups of two rollers mounted in vertical alignment; a lever for supporting each group of rollers; a pivot-pin for each lever; means for connecting said levers for simultaneous arcuate movement, spring actuated means for normally closing said groups of rollers into sausage engaging position; means for rotating the rollers for the purpose of twisting said sausage-link, and stationary means positioned on said machine and adapted to be engaged by said twisting element for disengaging said rollers from said sausage-link.

9. In a sausage twisting machine, a sausage twisting-element comprising four parallel rollers having substantially the form of a spherical zone and adapted to receive therebetween a sausage-link, said rollers being disposed in two groups of two rollers mounted in vertical alignment; a lever for supporting each group of rollers; a pivot-pin for each lever; a shaft for each roller; means for securing said rollers on said shafts for rotation therewith and for longitudinal rocking movement thereon; means for connecting said levers for simultaneous arcuate movement, and means for rotating said shafts and rollers for the purpose of twisting said sausage-link.

10. In a sausage twisting machine, a sausage twisting-element comprising four parallel rollers having substantially the form of a spherical zone and adapted to receive therebetween a sausage-link, said rollers being disposed in two groups of two rollers mounted in vertical alignment; a lever for supporting each group of rollers; a pivot-pin for each lever; a shaft for each roller; means for securing said rollers on said shafts for rotation therewith and for longitudinal rocking movement thereon; means for connecting said levers for simultaneous arcuate movement; spring actuated means for normally closing said two groups of rollers into sausage engaging position, and individual means for rotating each group of rollers.

11. In a sausage twisting machine, a sausage clamping-element comprising two levers rockable in a common plane; a pivot-pin for each lever; a common support for said pivot-pins; a clamping-member positioned on each lever and adapted to engage a sausage-link; means for connecting said levers for simultaneous arcuate movement; spring operated means for normally pressing said clamping-members on said sausage-link, and stationary means positioned on said machine and adapted to be engaged by said clamping-elements for the purpose of disengaging same from said sausage-link.

12. In a sausage twisting machine, an endless feed-conveyor for feeding a stuffed sausage casing and an endless main-conveyor; a plurality of unitary means disposed equidistantly about said feed-conveyor and adapted for supporting said casing and dividing same into sausage-links; link clamping and link twisting means disposed equidistantly and alternately about said main-conveyor; means for cleaning said sausage twisting means, and means for simultaneously operating said conveyors.

13. In a sausage twisting machine, an endless main-conveyor; a plurality of sausage twisting-elements mounted thereon, each element comprising a plurality of parallel rollers adapted to engage therebetween a sausage-link; a plurality of brushes mounted on said machine and adapted to be engaged by said rollers for the purpose of cleaning same, and means for operating said conveyor.

14. In a sausage twisting machine, an endless main-conveyor; a plurality of sausage twisting elements mounted thereon, each element comprising a plurality of parallel rollers adapted to engage therebetween a sausage-link; a plurality of stationary brushes disposed in parallel relation to the direction of travel of said conveyor and adapted to be engaged by said rollers for the purpose of cleaning same, and means for operating said conveyor.

15. In a sausage twisting machine, an endless main-conveyor; a plurality of sausage twisting elements mounted thereon; each element comprising a plurality of parallel rollers adapted to engage therebetween a sausage-link; a plurality of stationary brushes disposed in parallel relation to the direction of travel of said conveyor and adapted to be engaged by said rollers; means for rotating said rollers while in engagement with said brushes for the purpose of cleaning said rollers, and means for operating said conveyor.

16. In a sausage twisting machine, a feed conveyor for feeding a stuffed sausage-casing and a main conveyor; unitary pinching means disposed equidistantly about said feed conveyor and adapted for supporting said casing before pinching and for subsequently dividing the same into sausage-links; link clamping and link twisting means carried by said main conveyor, and means for operating said conveyors.

17. In a sausage twisting machine, an endless feed conveyor for feeding a stuffed sausage casing and an endless main conveyor; a plurality of unitary pinching means disposed equidistantly about said feed conveyor and adapted for supporting said casing before pinching and for subsequently dividing the same into sausage-links; link clamping means and link twisting means disposed equidistantly and alternately about said main conveyor, and unitary means for simultaneously operating said conveyors.

18. In a sausage twisting machine, an endless feed-conveyor for feeding a stuffed sausage casing and an endless main-conveyor; a plurality of unitary pinching means disposed equidistantly about said feed-conveyor and adapted for supporting said casing before pinching and for subsequently dividing the same into sausage-links; means for normally holding said pinching means into non-pinching position; means for closing said pinching means on said casing and dividing the same into sausage-links; link clamping and link twisting means disposed equidistantly and alternately about said main-conveyor, and unitary means for simultaneously operating said conveyors at the same speed.

19. In a sausage twisting machine, a sausage twisting element comprising four parallel rollers adapted to engage a sausage link at four points of its circumference, and means for rotating said rollers for the purpose of twisting said sausage link.

20. In a sausage twisting machine, a sausage twisting element comprising four parallel rollers adapted to engage a sausage link at four points of its circumference; means for normally pressing said rollers against said sausage link, and means for simultaneously rotating said rollers for the purpose of twisting said sausage link.

21. In a sausage twisting machine, a sausage twisting element comprising four parallel rollers adapted to engage simultaneously a sausage link at four points of its circumference; means for normally pressing said rollers against said sausage link, and means for simultaneously rotating said rollers for the purpose of twisting said sausage link.

22. In a sausage twisting machine, a sausage twisting element comprising four parallel rollers adapted to engage simultaneously a sausage link at four points of its circumference; means for normally exerting a yielding pressure by the rollers on said sausage link, and means for simultaneously rotating said rollers for the purpose of twisting said sausage link.

23. In a sausage twisting machine, a sausage twisting element comprising a plurality of parallel rollers severally adapted to engage a sausage link at different points of its circumference; and means for rotating said rollers for the purpose of twisting said sausage link.

24. In a sausage twisting machine, a sausage twisting element comprising a plurality of parallel rollers severally adapted to simultaneously engage a sausage link at different points of its circumference; means for normally pressing said rollers against said sausage link, and means for simultaneously rotating said rollers for the purpose of twisting said sausage link.

25. In a sausage twisting machine, a sausage clamping element comprising two levers rockable in a common plane; a rigid and substantially V-shaped clamping member positioned on each lever and adapted to engage the major portion of a sausage link, and means for normally pressing said clamping members on the sausage link.

26. In a sausage twisting machine, a sausage clamping element comprising two levers rockable in a common plane; a pivot pin for each lever; a rigid and substantially V-shaped clamping member positioned on each lever and adapted to engage the major portion of a sausage link; means for connecting said levers for simultaneous arcuate movement, and means for normally pressing the clamping members on the sausage link.

27. In a sausage twisting machine, a sausage clamping element comprising two levers rockable in a common plane; a pivot pin for each lever; a rigid and substantially V-shaped clamping member positioned on each lever and adapted to engage the major portion of a sausage link; means for connecting said levers for simultaneous arcuate movement; means for normally pressing the clamping members on the sausage link, and means for disengaging said clamping members from said sausage link.

28. In a sausage twisting machine, an endless feed conveyor for feeding a stuffed casing; supporting means for the casing disposed about said conveyor; end pulleys for supporting and driving the conveyor and an intermediate pulley adapted to support the operative portion of the conveyor, the operative portion of said conveyor between the front pulley and the intermediate pulley being downwardly inclined relative to the remaining operative portion of the conveyor.

29. In a sausage twisting machine, an endless feed conveyor for feeding a stuffed casing; unitary pinching means disposed about said conveyor and adapted for supporting said casing before pinching and for subsequently dividing the same into sausage links; means for normally holding the pinching means in open or non-pinching position; end pulleys for supporting and driving the conveyor; an intermediate pulley adapted to support the operative portion of the conveyor, the operative portion of the conveyor between the front pulley and the intermediate pulley being downwardly inclined relative to the remaining operative portion of the conveyor, and means for forcing said pinching means into closed or pinching position.

30. In a sausage twisting machine, an endless feed conveyor for feeding a stuffed casing; unitary pinching means disposed about said conveyor and adapted for supporting said casing before pinching and for subsequently dividing the same into sausage links; means for normally holding the pinching means in open or non-pinching position; end pulleys for supporting and driving the conveyor; an intermediate pulley adapted to support the operative portion of the conveyor, the operative portion of the conveyor between the front pulley and the intermediate pulley being downwardly inclined relative to the remaining operative portion of the conveyor; and cam rails adapted to be engaged by the pinching means for closing the same into casing pinching position.

31. In a sausage twisting machine, an endless feed conveyor for feeding a stuffed casing; unitary pinching means disposed about said conveyor and adapted for supporting said casing before pinching and for subsequently dividing the same into sausage links; spring means for normally holding the pinching means in open or non-pinching position; end pulleys for supporting and driving the conveyor; an intermediate pulley adapted to support the operative portion of the conveyor, the operative portion of the conveyor between the front pulley and the intermediate pulley being downwardly inclined relative to the remaining operative portion of the conveyor, and cam rails positioned below the operative portion of said conveyor and adapted to be engaged by the pinching means for gradually closing the same into casing pinching position.

In testimony whereof we affix our signatures.

CHARLES H. ALLEN.
JOLLY L. MORRIS.